United States Patent [19]

Ball et al.

[11] Patent Number: 5,564,832
[45] Date of Patent: Oct. 15, 1996

[54] BIREFRINGENT ACTIVE FIBER LASER SENSOR

[75] Inventors: Gary A. Ball, Simsbury; Gerald Meltz, Avon, both of Conn.

[73] Assignee: United Technologies Corporation, Hartford, Conn.

[21] Appl. No.: 475,124

[22] Filed: Jun. 7, 1995

Related U.S. Application Data

[60] Division of Ser. No. 69,231, May 28, 1993, Pat. No. 5,513,913, which is a continuation-in-part of Ser. No. 11,440, Jan. 29, 1993, abandoned.

[51] Int. Cl.$^6$ .............................. G01K 11/00; G01L 1/24; G01B 11/16
[52] U.S. Cl. ................... 374/161; 374/120; 250/227.14; 250/227.18; 356/33; 356/44; 73/800; 385/12; 372/6; 372/102
[58] Field of Search ..................................... 374/120, 159, 374/161, 131, 137, 143; 250/227.14, 227.18, 227.23, 227.17; 356/32, 33, 44; 73/800; 385/11, 12, 13; 372/6, 102

[56] References Cited

U.S. PATENT DOCUMENTS

| | | | |
|---|---|---|---|
| 4,133,612 | 1/1979 | Redman | 356/350 |
| 4,140,393 | 2/1979 | Cetas | 374/161 |
| 4,475,812 | 10/1984 | Buczek et al. | 356/32 |
| 4,508,461 | 4/1985 | Lambert | 374/161 |
| 4,653,906 | 3/1987 | Dunphy et al. | 356/32 |
| 4,725,110 | 2/1988 | Glenn et al. | 350/3.61 |
| 4,761,073 | 8/1988 | Meltz et al. | 356/32 |
| 4,806,012 | 2/1989 | Meltz et al. | 356/32 |
| 4,807,950 | 2/1989 | Glenn et al. | 350/3.61 |
| 4,814,604 | 3/1989 | Lequime | 374/161 |
| 4,842,403 | 6/1989 | Tarbox et al. | 356/32 |
| 4,950,886 | 8/1990 | Claus et al. | 250/227.14 |
| 4,970,385 | 11/1990 | Tatsuno et al. | 374/161 |
| 5,035,511 | 7/1991 | Berthold | 374/131 |

(List continued on next page.)

FOREIGN PATENT DOCUMENTS

86/01286  2/1986  WIPO.

OTHER PUBLICATIONS

Kim et al., "Polarimetric fiber laser sensors", Optics Letters, vol. 18, No. 4; Feb. 15, 1993.
G. A. Ball et al., "Continuously tunable single-mode erbium fiber laser", Optic Letters, vol. 17, No. 6, 15 Mar. 1992, pp. 420–422.
Serge Melle et al., "Structural Sensing Using a Fiber Laser Strain Sensor", SPIE, vol. 1798, 8 Sep. 1992, pp. 227–236.
Tino Alavie et al., "Bragg Fiber Laser Sensor", SPIE, vol. 1795, 8 Sep. 1992, pp. 194–203.
H. K. Kim et al., "Polarization and modal properties of rare earth doped fiber lasers", SPIE, vol. 1817, 16 Dec. 1992, pp. 104–113.

(List continued on next page.)

Primary Examiner—Diego F. F. Gutierrez
Attorney, Agent, or Firm—Gerald L. DePardo

[57] ABSTRACT

A birefringent active fiber laser sensor includes one or more fiber lasers 12, 14, 16, each having a pair of Bragg gratings 18, 20, embedded in a fiber 10 and excited by a common pump light 30. At least one of the lasers 12, 14, 16 has a laser cavity wit a predetermined birefrigence and a lasing light at a first lasing frequency along a first polarization axis, and at a second fusing frequency along a second polarization axis. A difference frequency between the first and the second lasing frequencies is related to the magnitude of the birefringence, and the birefringence varies in response to a perturbation. Output light 104 from each of the lasers 12,14,16 is fed to a defraction grating 106 which splits the beam 104 into different wavelength groups, each group having the two lasing frequencies and polarizations of a given laser. Each wavelength group is fed to a corresponding analyzer 122–126 which combines the first and second frequencies and polarizations for each laser to form a lower difference or "beat" frequency, thereby allowing lower frequency detection devices 138–142 to be used.

31 Claims, 7 Drawing Sheets

U.S. PATENT DOCUMENTS

| | | | |
|---|---|---|---|
| 5,064,270 | 11/1991 | Turpin et al. | 73/800 |
| 5,098,197 | 3/1992 | Shepard et al. | 374/120 |
| 5,182,779 | 1/1993 | D'Agostino et al. | 385/13 |
| 5,319,435 | 6/1994 | Melle et al. | 356/32 |
| 5,361,313 | 11/1994 | O'Keefe | 385/12 |
| 5,399,854 | 3/1995 | Dunphy et al. | 250/227.14 |
| 5,401,956 | 3/1995 | Dunphy et al. | 250/227.18 |

OTHER PUBLICATIONS

Norman S. K. Kwong, "Fiber-optic sensor using a tandem combination of a multimode fiber and a self-pumped phase conjugator", Optic Letters, vol. 14, No. 11, 1 Jun. 1989, pp. 590–592.

A. D. Kersey et al., "Dual Wavelength Fibre Interferometer with Wavelength Selection via Fibre Bragg Grating Elements", Electronics Letters, vol. 28, No. 13, 18 Jun. 1992, pp. 1215–1216.

Varnham et al., "Polarimetric Strain Gauges using High Birefringence Fibre", Electronics Letters, vol. 18, No. 17, 18 Aug. 1983, pp. 699–700.

Wong et al., "Strain–Induced Birefringence in Mechanically Inhomogeneous Optical Fibre", Electronics Letters, vol. 25, No. 22, 26 Oct. 1989, pp. 1545–1547.

BIREFRINGENT ACTIVE FIBER LASER SENSOR

CROSS REFERENCE TO RELATED APPLICATIONS

This is a division of application Ser. No. 08/069,231, filed on May 28, 1993, now U.S. Pat. No. 5,513,913, which is a Continuation-in-Part of U.S. patent application Ser. No. 08/011,440, filed Jan. 29, 1993, now abandoned.

TECHNICAL FIELD

This invention relates to sensors, and more particularly to active multipoint fiber laser sensors.

BACKGROUND ART

It is known in the art to make passive strain sensors employing an optical fiber having intracore Bragg gratings as reflectors embedded therein. A Bragg grating, as is known, reflects only a narrow wavelength of light incident thereon, i.e., it has a narrow wavelength reflection band. Bragg gratings can be holographically written into the core of many experimental and commercially available fibers, as described in commonly owned U.S. Pat. No. 4,725,110 to Glenn et al, entitled "Method For Impressing Gratings Within Fiber Optics", and U.S. Pat. No. 4,807,950 to Glenn et al, entitled "Optical Fiber With Impressed Reflection Gratings".

Such passive sensors typically involve injecting a broadband source light into one end of a fiber having a plurality of Bragg gratings written successively therein, each having a different central reflective wavelength. A portion of the source light is reflected off a first grating having a reflective wavelength associated with the first grating. The rest of the source light passes through the first grating and on to a second grating in the fiber where again a portion is reflected having a wavelength associated with the second grating, and so on. The reflected light is detected by a wavelength detector at the end of the fiber where the source light was injected.

If one of the gratings in the fiber is subjected to a perturbation, e.g., a mechanical strain, a pressure, or a temperature change, the perturbation alters the optical path length between successive elements within the Bragg grating, thereby shifting the reflection wavelength of the Bragg grating. This wavelength shift may then be detected by the wavelength detector. The amount of wavelength shift is indicative of the size of the perturbation imposed on the fiber at the location of the grating. Thus, optical fiber Bragg grating sensors can be attached to or embedded in a medium to detect a wide range of environmental perturbations. This passive sensor technique is described in U.S. Pat. No. 4,806,012 to Meltz et al, entitled "Distributed, Spatially Resolving Optical Fiber Strain Gauge", and U.S. Pat. No. 4,761,073 to Meltz et al, entitled "Distributed, Spatially Resolving Optical Fiber Strain Gauge".

When a low power broadband light source is used, the resulting signal-to-noise ratio is quite low because only a small spectral portion of the light is reflected. For example, for a broadband source emitting 100 µWatts at 50 nm, and a 50% grating reflector having a 0.1 nm wavelength bandwidth, the return power of the light is about 0.1 µWatts, provided there are no other losses in the system (i.e., 100% system efficiency). Also, other system losses further contribute to signal degradation, such as fiber coupling losses or fiber mismatches, or other fiber splice losses. This results in a low signal-to-noise ratio of the detected signal. A low signal-to-noise ratio requires long filter time constants in the detector thereby resulting in reduced sensor response time, and/or reduces the accuracy of the measurement in noisy environments.

Alternatively, if a narrow band light source is used, all the power is typically concentrated into a narrow bandwidth which is smaller than the span of fiber grating wavelength shift over the sensed perturbation operating profile. Thus, narrow band lasers must be frequency tuned or scanned to track the grating reflection wavelength shift over the range of operating conditions.

Therefore, it is desirable to provide a sensor that does not have the aforementioned signal-to-noise problems associated with passive low power broadband source Bragg grating sensors, nor the frequency tuning/scanning requirements or other drawbacks of passive narrow band source Bragg grating sensors.

DISCLOSURE OF THE INVENTION

Objects of the invention include provision of a remote active multipoint fiber laser sensor which increases signal-to-noise ratios and increases resolution over conventional passive Bragg grating sensors.

According to the present invention, an active laser perturbation sensor employs an optical waveguide for receiving and propagating a pump light of a predetermined wavelength launched into the optical waveguide; a laser, disposed along the waveguide, being pumped by the pump light, at least a portion of the laser being exposed to a perturbation; the laser having a laser cavity with a predetermined birefringence, having lasing light at a first lasing frequency along a first polarization axis and a second lasing frequency along a second polarization axis, the laser emitting an output light having frequencies and polarizations at the first and the second lasing frequencies and polarizations; a difference frequency between the first and second lasing frequencies being related to the magnitude of the birefringence and the birefringence varying in response to the perturbation; combining means for combining the first and the second polarizations of the output onto a common polarization as a commonly polarized output light; detector means for providing an electrical signal, indicative of the commonly polarized output light, having a frequency component related to the difference frequency between the first and the second lasing frequencies; and the laser having a pair of reflective elements on opposite ends of the laser cavity and having a gain medium therebetween.

The invention represents a significant improvement over previous strain sensor devices, such as the aforementioned passive optical fiber Bragg grating sensor, by providing active fiber lasers using Bragg reflectors for cavity feedback. The invention significantly increases the signal-to-noise ratio, because the fiber lasers can be operated at higher (i.e., milliwatt) powers than the passive devices in the prior art. Furthermore, the invention will work with either single longitudinal mode or multimode linear rare-earth-doped fiber lasers. Also, the invention provides the ability to operate at a plurality of wavelengths, thereby achieving a multi-point wavelength multiplexed array of active sensors in a single fiber. Furthermore, lasers may be designed to transmit in both directions, thereby allowing detection at either end of the fiber. Still further, the invention provides linear and repeatable regions of sensing.

Also, a birefringent fiber is used as a fiber laser cavity, thereby creating at least one output lasing frequency on each polarization; the frequencies are beat together to form a low "beat" frequency and thus allows lower frequency detectors to be used. Perturbations are detected by a change in difference or beat frequency that occurs due to a corresponding change in birefringence within the fiber cavity. Further, a single laser or a plurality of lasers may be used with the present invention.

BEST MODE FOR CARRYING OUT THE INVENTION

Figures 1, 12:
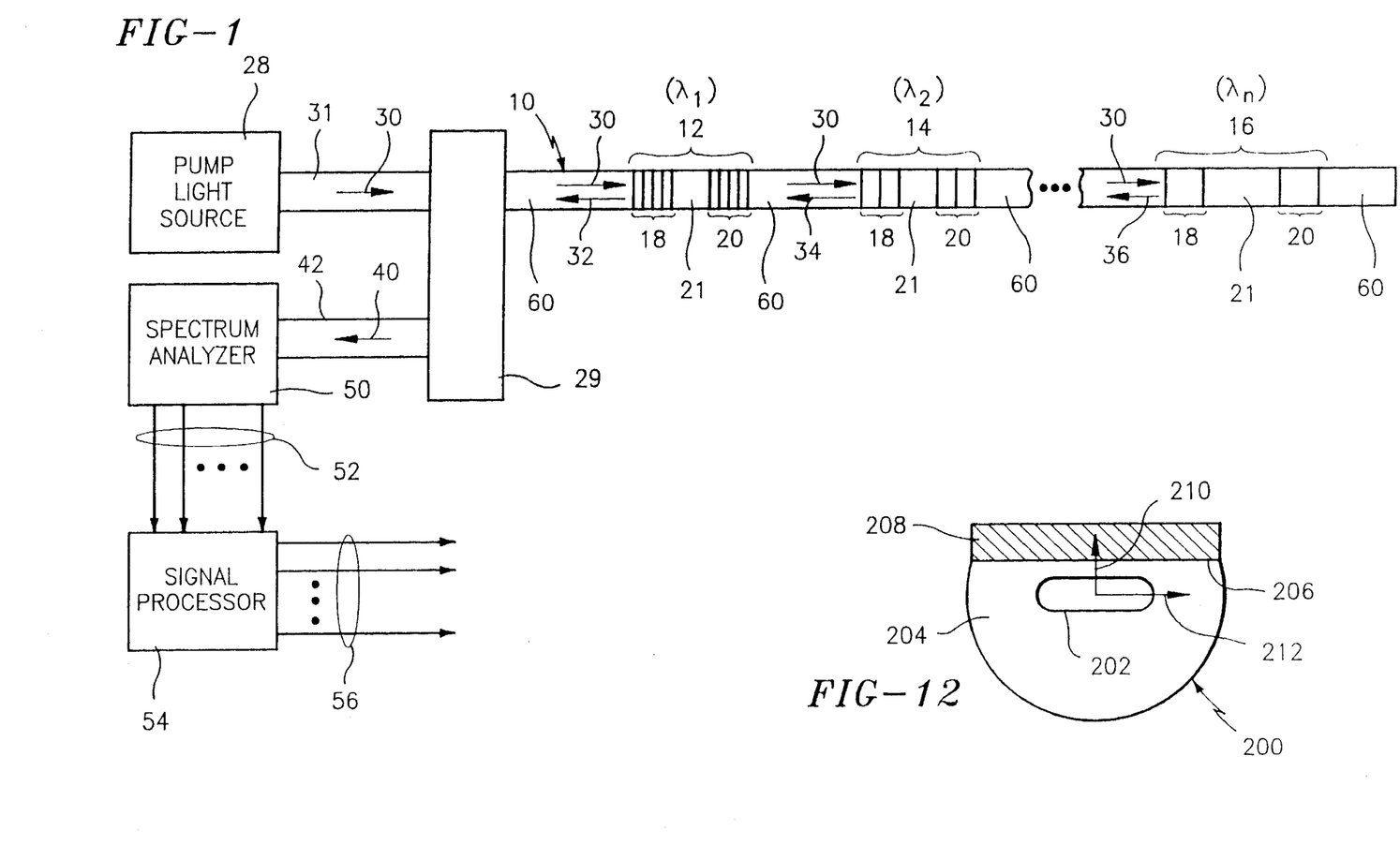
FIG. 1 is a schematic block diagram of a remote active multipoint fiber laser sensor having plurality of fiber lasers located along a single fiber and being optically pumped and detected at the same end of the fiber, in accordance with the present invention.
FIG. 12 is a side-cut away view of a fiber and a chemical sensitive medium used to create a birefringent fiber in accordance with the present invention.

Referring to FIG. 1, an optical waveguide 10, e.g., an single spacial mode erbium doped communication-type optical fiber, is provided with a plurality of fiber lasers 12,14,16. The lasers 12–16 are distributed along the fiber 10, each acting as a sensor and each being located at a point where a perturbation, e.g., strain, temperature, pressure, etc., measurement is to be made. Other rare-earth doped optical fibers or waveguides may be used if desired.

Each of the lasers 12–16 has a pair of Bragg grating reflectors 18,20 embedded in the core of the fiber 10 by known techniques, such as the holographic technique described in the aforementioned commonly owned U.S. Pat. Nos. 4,725,110 and 4,807,950. Between the gratings 18,20 for each laser is a cavity region 21 having a predetermined length and gain that, together. with the gratings 18,20, forms a fiber laser, as is discussed in commonly owned U.S. Pat. No. 5,305,335, entitled "Single Longitudinal Mode Pumped Optical Waveguide Laser Arrangement".

A pump light source 28, e.g., an 80 mW, 980 nm laser diode, provides pumping light 30 along a fiber 31 to a coupler 29, e.g., a wavelength division multiplexer (WDM), that couples the light 30 from the fiber 31 into one end of the fiber 10 to pump the fiber lasers 12–16. Other rare-earth doped fiber lasers may be used if desired, provided sufficient gain exists for lasing to occur and proper pump wavelength is used, such as a neodymium doped fiber laser pumped by an 810 nm laser diode.

The fiber 10 may be disposed on the surface of a structure (not shown) or embedded therein having the lasers 12–16 strategically located at points along the fiber 10 in the structure where perturbations are to be detected.

The Bragg gratings 18,20, as is known and as discussed hereinbefore, are highly reflective over a narrow wavelength spread. Consequently, each fiber laser 12,14,16 may be designed to lase over a narrow wavelength spread (i.e., at a single or small number of longitudinal modes), each having a central wavelength $\lambda 1, \lambda 2, \lambda n$, respectively. For example, for an erbium doped fiber laser pumped at 980 nm, the lasing wavelength is about 1.53 microns.

Light 30 from the coupler 29 (and from the source 28) is launched into a receiving end of the fiber 10 and excites the fiber laser 12 to lase at a predetermined wavelength, e.g., about 1.5 microns. Other lasing wavelengths may be used if desired. Because the Bragg gratings 18,20 have a narrow reflectivity bandwidth different from that of the pump light source, pump light 30 pumps the laser 12 and passes through the gratings 18,20 of the laser 12 and pumps the laser 14, and so on along the fiber 10, including the laser 16. It should be understood that the pump power required to pump all the fiber lasers in the system is directly related to the length of the fiber and the number of lasers to be pumped along the fiber 10.

The lasers 12–16 are designed to emit output light from both the front gratings 18 and the rear gratings 20, however only light emitted from the front gratings 18 is detected. More specifically, the laser 12 emits a light 32, from its front grating 18, indicative of the lasing wavelength associated with the laser 12. Similarly, the laser 14 emits a light 34, from the front facet 18, indicative the lasing wavelength of the laser 14. Also, the laser 16 emits a light 36, from its front facet 18, having a wavelength indicative of the lasing wavelength of the laser 16. The light beams 32,34,36 emitted from the lasers 12,14,16, respectively, exit the fiber 10 from the same end that the pumped light 30 was injected and enters the coupler 29 which couples the light 32,34,36, collectively indicated by a line 40, onto a fiber 42.

The output light 40 is detected by a known spectrum analyzer 50, e.g., a Fabry Perot optical spectrum analyzer having a resolution of 15 MHz, or a grating spectrum analyzer having a resolution of 0.1 to 0.01 nm. Any device capable of detecting optical wavelengths may be used if desired. When a fiber laser is subjected to a perturbation such as a mechanical strain or temperature change, the lasing wavelength shifts in a predictable way (discussed hereinafter). As the lasing wavelengths of the fiber lasers 12–16 shift, the spectrum analyzer 50 detects these shifts and provides electrical signals on a plurality of lines 52, each providing an electrical signal indicative of the lasing wavelength of a given fiber laser to a signal processor 54. The processor 54 determines the relative change in the sensed perturbations from the wavelength shifts, and provides a plurality of electrical output signals on lines 56 indicative of the sensed perturbation, e.g., temperature, pressure, strain, etc., at the given laser location along the fiber.

Figure 2:
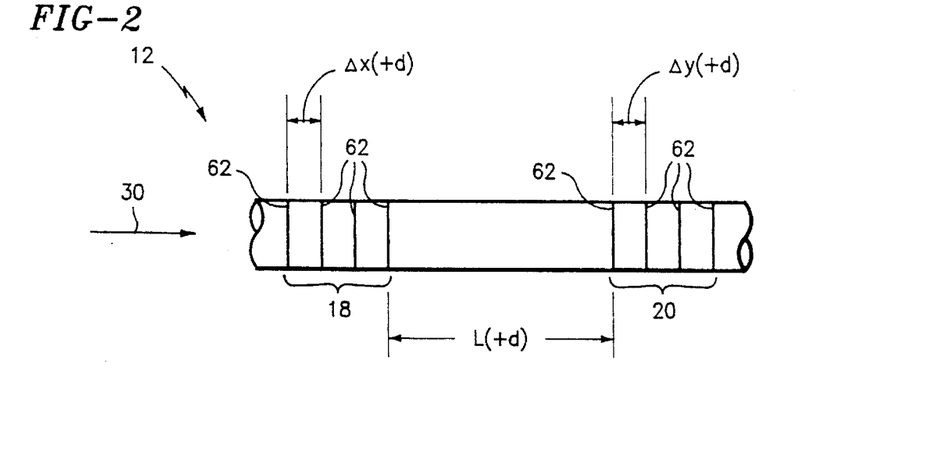
FIG. 2 is an expanded view of a single fiber laser within the fiber laser sensor, in accordance with the present invention.

Referring now to FIG. 2, each of the gratings 18,20 are made up of a plurality of lines (or periods or elements) 62 which represent the periodicity of the variation in refractive index (n) imposed in the core of the fiber by a holographic technique described in the aforementioned U.S. Pat. Nos. 4,725,110 and 4,807,950. For example, each line 62 represents a peak in a sine-wave-type distribution of n value along the gratings 18,20. When "weak" gratings (i.e., for small amplitudes of n variation) are considered, the number of periods 62 in a grating relates to narrowness of the wavelength reflection band for a given amplitude of n variation.

As is known, the wavelengths reflected by a grating is directly related to the spacing $\Delta x, \Delta y$ between periods of n-variation (i.e., the periodicity) for the gratings 18,20, respectively. More specifically, the central wavelength $\lambda b$ where the grating reflectivity is a maximum is defined generally as $\lambda b = \Delta x/2n_{eff}$; where $n_{eff}$ is the refractive index associated with the spacial mode propagation within the optical waveguide.

The amount of reflectivity (i.e., the strength) of the grating is determined by the product of the length of the grating and the maximum index change (i.e., the amplitude of the periodic index distribution). It should be understood that in FIGS. 1 and 2 the number of periods 62 shown are much fewer than that actually used and is merely for illustrative purposes.

The fiber laser is designed with a cavity length L between the two reflective gratings, thereby making a laser that will lase at longitudinal modes defined by the well known resonance condition of $2n_{eff}L = m\lambda$; where m is an integer, $\lambda$ is the resonance wavelength in a vacuum, and L is the length of the cavity. The cavity length L is sized to be long enough to provide adequate gain for lasing to occur. The length L can range from a centimeter to hundreds of centimeters; however other lengths may be used if desired.

If the perturbation on the laser causes the period spacing $\Delta x$ for the grating 18, the period spacing $\Delta y$ for the grating 20, and the cavity length L, all to change by the same optical path distance d, and/or causes the refractive index in each area to change equally, the laser will smoothly change its lasing wavelength, i.e., be "tuned", to a new lasing wavelength.

Figure 3:
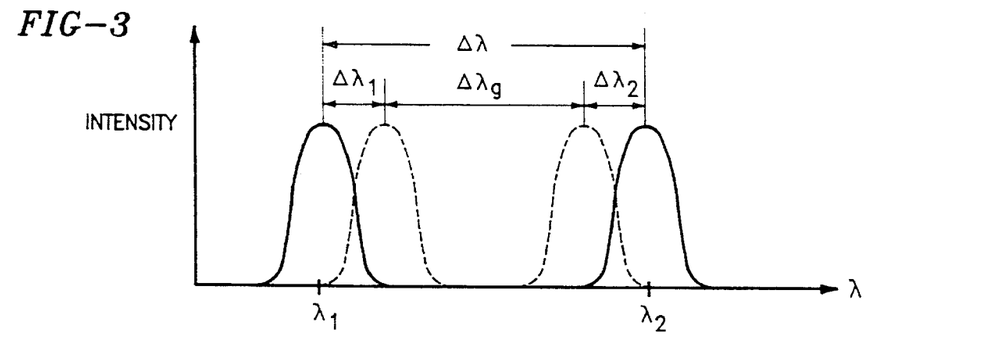
FIG. 3 is a graph of intensity versus grating wavelength spectrum for two fiber lasers showing a lasing wavelength shift for each laser and a guardband to prevent laser coupling, in accordance with the present invention.

Referring now to FIG. 3, the lasing wavelengths $\lambda 1, \lambda 2, \lambda n$ for each of the lasers 12,14,16 should be designed to lase at different wavelengths with a sufficient gap therebetween so there is no (or minimal) overlap between the grating wavelength spectrum of different lasers over the perturbation operating profile. Although some overlap is allowable, if there is significant grating spectral overlap between two lasers, the lasers become coupled resulting in distorted output signals. Thus, wavelength separation $\Delta\lambda$ between adjacent wavelength lasers should be large enough to account for the maximum anticipated individual laser variation $\Delta\lambda 1, \Delta\lambda 2$ due to the sensed perturbations, plus an additional wavelength separation $\Delta\lambda g$, called a "guardband", to ensure no grating spectral overlap. This ensures the lasers will operate independently, thereby preventing laser coupling. For the present invention the guardband was set as 0.2 nm; however other guardbands may be used if desired.

Sensitivity to external perturbations on the fiber is proportional to the reflection wavelength of the Bragg grating pair associated with a given laser, and also a function of temperature change and mechanical longitudinal strain. It should be understood that any perturbation that changes the period or effective refractive index of the grating may be sensed. The fractional change in reflection wavelength and thus lasing wavelength due to mechanical strain or temperature change is:

$$\delta\lambda/\lambda = (q+\alpha)\Delta T + (1+[\delta n/\delta\epsilon]/n)\epsilon \approx 7.1\times10^{-6}\Delta T + 0.79\epsilon. \quad [\text{eq. 1}]$$

where:

q is the thermo-optic coefficient, which is wavelength dependant; $\alpha$ is the expansion coefficient of the waveguide; $\epsilon$ is the axial or longitudinal strain; $\lambda$ is central the wavelength reflected by the grating; n is the refractive index of the optical waveguide core; and $\Delta$ is the change in temperature.

Figure 4:
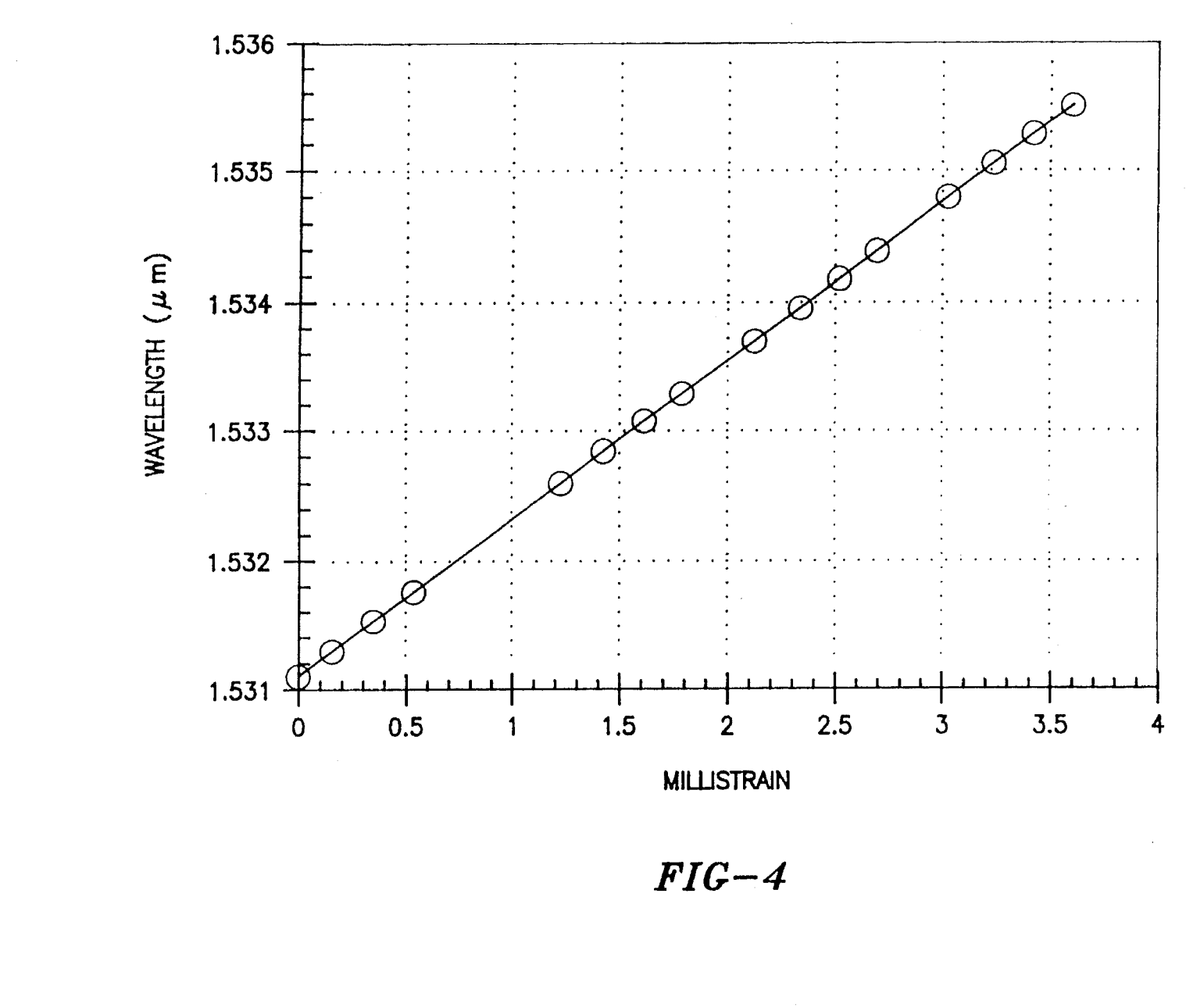
FIG. 4 is a graph of lasing wavelength versus millistrain for a given fiber laser, showing the linear variation of wavelength with strain, in accordance with the present invention.

Referring now to FIG. 4, we have found that, for an erbium doped fiber laser, the linear relationship described in equation 1 above between wavelength change and the strain induced on a fiber laser is not only linear but also repeatable. The data in FIG. 4 was obtained from a fiber laser having a 3 cm cavity length; however other cavity lengths may be used if desired.

Figure 5:
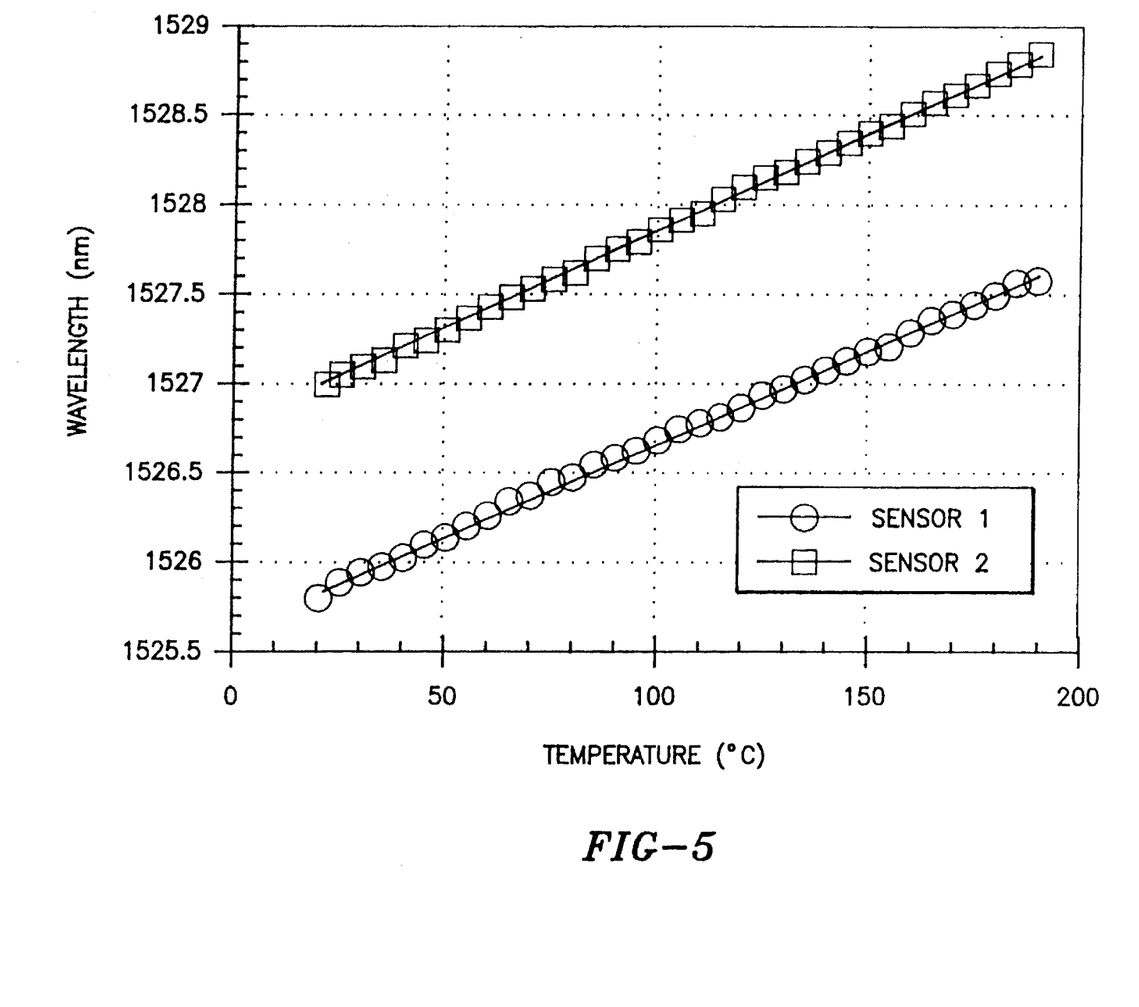
FIG. 5 is a graph of lasing wavelength versus temperature for two fiber laser sensors on the same fiber, showing the linear variation of wavelength with temperature, in accordance with the present invention.

Referring now to FIG. 5, we have also found that, for an erbium doped fiber laser, the linear relationship described in equation 1 above between wavelength change and temperature change on a fiber laser is both linear and repeatable for two lasers having different central wavelengths, on the same fiber. The sensor wavelength variation as a function of thermal variation was measured to be about 0.011 nm/deg C as shown in FIG. 5, for a fiber laser having a 25 cm cavity length operating in 3 to 5 lasing modes (depending on the pump power applied). Other cavity lengths and numbers of lasing modes may be used if desired.

One way to determine the strain on a given laser is to hold the temperature constant or measure (or calculate) the temperature at the laser and then solve Eqtn. 1 for the strain applied. A similar technique can be used to determine temperature.

Because the sensitivity of wavelength change with temperature is also a function of wavelength, a temperature related shift may be detected without holding the strain constant. For example, if two lasers operating at different wavelengths are be placed side-by-side or end-to-end such that they both experience the same strain, both will experience the same shift due to the strain but a different shift due to temperature. Thus, if the shifts of the two lasers are subtracted, the shift that remains is due solely to temperature.

Referring now to FIG. 2, if the perturbation causes non-uniform changes between the periods of the gratings 18,20, and the cavity length L, the laser will randomly (in time) mode-hop back and forth between two longitudinal modes for a given applied strain or temperature, thereby degrading sensor resolution. In that case, the sensor resolution or uncertainty is equal to the frequency separation $\Delta v$ (or free-spectral range) between adjacent modes which is given by the well known equation $\Delta v = c/2n_{eff}L$; where c is the speed of light and L is the laser cavity length. Thus, for a 3 cm cavity length, the wavelength will vary 0.027 nm ($\Delta v$=3.4 Hz) and for a 25 cm cavity length the wavelength variation will be 0.0032 nm ($\Delta v$=0.41 Hz).

This degradation can be reduced by allowing the sensor to lase in a plurality of (e.g., 5) modes (i.e., use multimode lasers). In that case, the average or central wavelength may be used to determine a given sensor wavelength. Thus, small perturbations in cavity length cause the spectral power (intensity) distribution among the longitudinal modes to shift, resulting in a smooth spectral transition from one mode to another, as opposed to the more abrupt mode-hopping which occurs in the aforementioned single mode laser.

Instead of having two narrow reflection wavelength band Bragg gratings for each laser sensor, the lasers may have one narrow and one broad band grating. A broad band grating may be created by making a shorter stronger (higher change in n variation) grating. In that case, the narrow band grating determines the lasing wavelength. Thus, the narrow band grating may be used as a "sensing" grating, having solely that grating at the point of measurement. This minimizes the effect discussed hereinbefore of nonuniform strain between one grating and the other of the same laser.

Also, the fiber 10 (FIG. 1) may be spliced at the end of, or into a section of, a longer communications grade fiber which is optically and materially compatible. Also, the distance from the coupler 29 to the first laser 12 may be a long distance, thereby allowing sensing of a remote site.

Furthermore, instead of having the fiber 10 (FIG. 1) being all the same rare-earth doped optical fiber, a non-doped (i.e., no gain) and/or lightly doped (i.e., small gain) fiber may be spliced in the regions 60 between the lasers 12–16 and/or between the laser 12 and pump light source 28 (i.e., "an additional" gain medium). This helps to minimize potential gain saturation caused by amplified laser light emitted from each laser which passes through other lasers, thereby partially exciting the gain medium of the other lasers in the system.

Although the lasers 12–16 (FIG. 1) have been described as having gratings that emit light from both the front grating 18 and the rear grating 20, it should be understood that the output light emitted from the gratings is determined by the reflectivity of the gratings. Thus, either or both gratings 18,20 may be designed to emit less amplified light therefrom by designing a very high reflectivity at the lasing wavelength(s). If wavelength detection is performed at one end of the fiber 10 (like in FIG. 1), it may be desirable to have the laser grating farthest from the sensor so designed.

It should be understood that even though the invention is described as being used with an optical fiber the invention will work equally well with any optical waveguide laser having gratings embedded therein that have reflectivity wavelengths that are sensitive to perturbations.

Even though the invention has been described as using Bragg gratings, it should be understood by those skilled in the art that any form of narrow band reflective surface having predictable reflection characteristics over strain and/or temperature may be used to delimit the laser cavity.

Also, although the invention has been described as using a plurality of successive lasers as sensors it should be understood that a single laser/sensor may also be used to sense only a single point.

Figure 6:
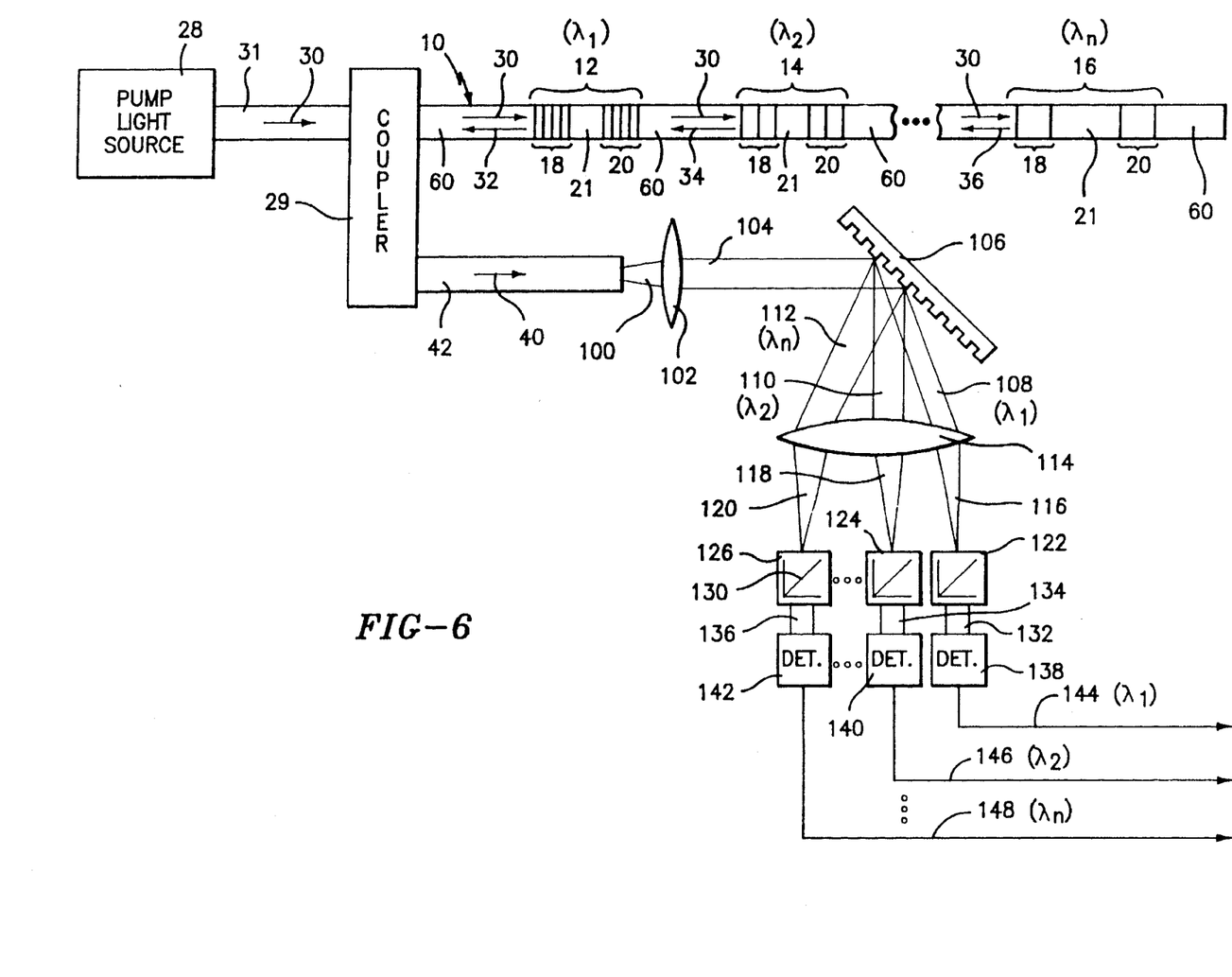
FIG. 6 is a schematic block diagram of a remote active multipoint fiber laser sensor having a plurality of fiber lasers located along a single fiber being optically pumped and detected at the same end of the fiber, in accordance with the present invention.

Referring to FIG. 6, instead of using a standard rare earth doped fiber for the fibers 21 that make up the cavities for the lasers 12,14,16, a birefringent fiber may be used. The fiber may be polarization preserving if desired. For this embodiment, birefringence in the fibers 21 causes a pair of adjacent lasing frequencies to exist, one on each of the axes of the birefringent fiber. Thus, each of the output light waves 32,34,36 from the lasers 12,14,16 comprise light polarized along a first and a second (orthogonal) axis.

As discussed hereinbefore, the coupler 29 couples the light beams 32,34,36 onto the fiber 42 as the combined beam 40. The light 40 exits the beam as a divergent beam 100 to a lens 102 which converts the beam 100 to a collimated beam 104. The beam 104 is incident on a diffraction grating 106 which splits the beam 104 into a plurality of collimated beams 108,110,112, each indicative of a different wavelength $\lambda 1$, $\lambda 2$, $\lambda n$, respectively. The beams 108,110,112 are incident on a lens 114 which converts them into focused beams 116,118,120, respectively, which are focused respectively onto 45 degree analyzers 122,124,126. The analyzers 122,124,126, as is known, provide an output beam indicative of a portion of the input beam projected onto its output axis 130 (discussed hereinafter). The analyzers 122,124,126 provide output beams 132,134,136, to optical detectors 138, 140,142, capable of detecting the corresponding wavelengths $\lambda 1$, $\lambda 2$, $\lambda n$, respectively. The optical detectors 138, 140,142 provide electrical signals on lines 144,146,148, corresponding to the wavelengths $\lambda 1$, $\lambda 2$, $\lambda n$, respectively. The lines 144,146,148 may each be fed to a corresponding discriminator (a low-cost electronic detector that operates over a narrow frequency range) or an electronic microwave or RF spectrum analyzer (not shown) to detect the desired frequencies (discussed hereinafter).

Figure 7:
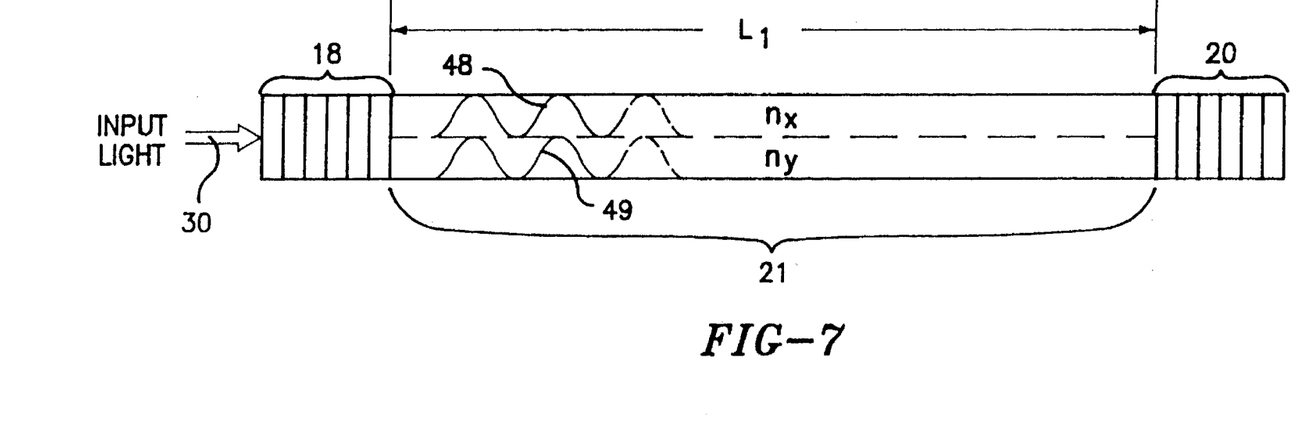
FIG. 7 is an expanded view of a single fiber laser within the fiber laser sensor, in accordance with the present invention.

Referring now to FIG. 7, the birefringent fiber 21 has an effective index of refraction $n_x$ along a first polarization axis (i.e., X-axis) and an effective index of refraction $n_y$ along an orthogonal polarization axis (i.e., Y-axis). The input (pump) light 30 propagates into the fiber 21 and along both polarization axes. Any type of pump light may be used provided lasing occurs in both polarizations (i.e., the longitudinal modes in both polarizations are excited). Because the fiber is birefringent, $n_x$ is different from $n_y$ and thus light 48 polarized along the X-axis will travel at a different speed (or velocity) than light 49 travelling along the Y-axis as is known. Thus, the optical path length seen by light along the X-axis will be different from that seen along the Y-axis. As a result, the laser will lase at two different frequencies, one along each polarization axis.

Figure 8:
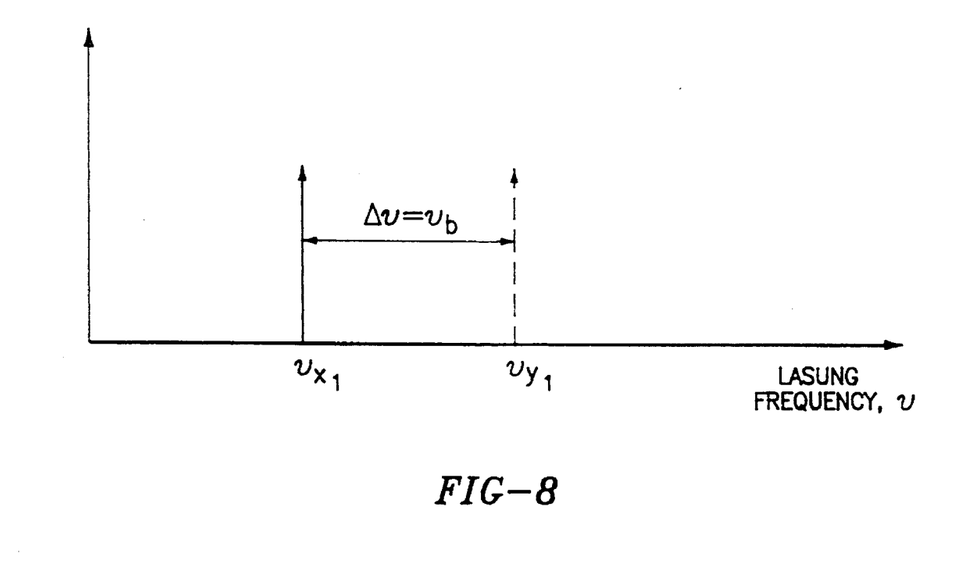
FIG. 8 is a diagram showing the lasing wavelengths of two orthogonal modes of a birefringent fiber in single-mode operation, in accordance with the present invention.

More specifically, referring to FIG. 8, for a single laser cavity, the lasing frequency along the X-axis is indicated by $v_{x1}$ and the lasing frequency along the Y-axis is indicated by $v_{y1}$. For a single longitudinal lasing mode in each polarization, there is only one such lasing frequency for each axis as shown. In such a case, the difference between the frequencies $v_{x1}$ and $v_{y1}$ would depend upon: the resonant frequency of the laser cavity (e.g., the longitudinal mode free spectral range), the birefringence of the cavity (caused by any means), and the spectral reflectivity characteristics of the gratings (i.e., the type of mode discrimination provided by gratings).

Two different polarization lasing frequencies $v_{x1}$ and $v_{y1}$ exit from each laser 12,14,16 as the beams 32,34,36 and emerge from the coupler as the combined beam 40, which are then split into separate beams 116,118,120 each indicative of the wavelengths $\lambda_1$, $\lambda_2$, $\lambda_n$, respectively. Although two (or more) wavelengths (or frequencies $v_{x1}$ and $v_{y1}$) actually lase for each laser, because the lines are close together each laser has been labeled in FIG. 6 as lasing at only a single general wavelength $\lambda_1$, $\lambda_2$, $\lambda_n$, which is approximately equal to the lasing lines for each of the lasers 12,14,16, respectively.

The analyzers 122,124,126 then combine a portion of the two polarization frequencies for a given wavelength into an output beam 132,134,136 having a 45 degree polarization (based on the output axis 130 of the analyzers). It should be understood that the output axis need not be 45 degrees. Also, instead of an analyzer, any means of combining the polarizations onto a common polarization may be used if desired.

The detectors 138,140,142, are photodiodes having a bandwidth capable of detecting the appropriate frequency range. In general, a detector generates a voltage proportional to the square of the optical fields applied thereto, that is, they perform optical coherent detection. Thus, if the sum of the electric fields along the output axis of the analyzer is equal to $E_1\cos v_1 t + E_2\cos v_2 t$, the output of the detector will be proportional to the square of that field. Also, the square of that field, as is known, contains a difference frequency ($\Delta v$) or beat frequency ($v_b$) being equal to the absolute value of the difference between the two lasing frequencies, i.e., $v_b = |v_1 - v_2|$. Other frequencies also exist, e.g., the sum frequency and the doubled frequency, which are much higher frequencies than the beat frequency $v_b$.

Consequently, for a given birefringence (i.e., a given difference between $n_x$ and $n_y$) of a given laser cavity, there will be an associated electrical output signal (from an associated detector) having a lowest frequency component equal to the value of the beat frequency $v_b$. The beat frequency $v_b$ will be at a much lower frequency than $v_1$ or $v_2$ individually and will be related to the fiber birefringence in a predictable way. Thus, this embodiment does not require the use of the optical spectrum analyzer 50 of FIG. 1, but may instead use a much lower (e.g., RF or microwave) frequency detector. For example, if the fiber birefringence is about $1\times10^{-5}$, and $v_1$ and $v_2$ are at approximately $2\times10^{14}$ Hz and are spaced by 680 MHz; thus the beat frequency $v_b$ will be 680 MHz.

Furthermore, the frequency response of the detectors 138,140,142 is such that they will filter out any extremely high frequencies. Thus, for example, a wideband optical detector, such as a GaAs photodetector has a detection frequency range of, e.g., 50 GHz. Other high speed optical detectors may be used if desired, provided they have acceptable bandwidth.

Figure 9:
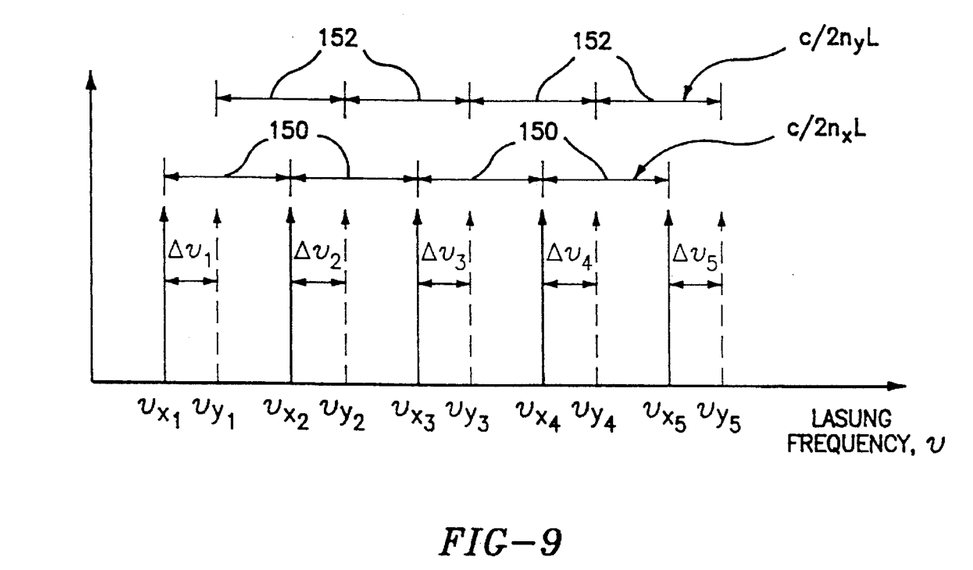
FIG. 9 is a diagram showing the lasing wavelengths of two orthogonal modes of a birefringent fiber in multi-mode operation, in accordance with the present invention.

Referring now to FIG. 9, if a plurality of lasing modes exist for each of the lasers 12,14,16, then a plurality of $\Delta v$'s will also exist, i.e., $\Delta v_1$, $\Delta v_2$, $\Delta v_3$, etc. Furthermore, the spacing 150 between adjacent modes of the X-axis polarization will be equal to $c/2n_xL$ and the spacing 152 between adjacent modes of the Y-axis polarization will be equal to $c/2n_yL$.

Because $n_x$ and $n_y$ are slightly different (e.g., due to birefringence), the spacing 150 is slightly different from the spacing 152. Thus, $\Delta v_1$ will be slightly larger than $\Delta v_2$ which will be slightly larger than $\Delta v_3$, etc. Thus, for the case of multi-mode operation, instead of getting a single $\Delta v$ beat frequency at the output of a given detector, there will be a frequency spread because a plurality of $\Delta v$ frequencies exist. Consequently, the line width of the beat frequency is larger with a multi-mode laser than with a single mode laser. In that case, resolution is slightly degraded and the more modes which exist, the more degradation (or the less accuracy) that occurs.

Also, it should be understood by those skilled in the art that a beat (or difference) frequency will exist for each pair of modes that exist (including modes along the same polarization axis). However, the beat frequency (or frequencies) between the x-axis and y-axis lasing frequencies that are to be detected may be selected as desired. For example, the lowest frequency difference value may be used to allow the use of a detector with a low bandwidth.

When using a birefringent fiber, instead of measuring a perturbation (e.g., strain or temperature) by detecting a shift in lasing wavelength, a shift in the aforementioned difference (or "beat") frequency is measured. It should be understood that a shift in lasing wavelength still occurs in this embodiment. It is known that if a strain is applied to an elliptical core polarization preserving fiber, $n_x$ and $n_y$ change differently, such that the difference (or birefringence) is a substantially linear function of the applied strain, as described in the articles: M. P. Varnham et al, "Polarimetric Strain Gauges Using High Birefringence Fibre", Electronics Letters, Vol. 18, No. 17 (August 1983); and D. Wong et al, "Strain-Induced Birefringence in Mechanically Inhomogeneous Optical Fibre", Electronics Letters, Vol. 25, No. 22 (October 1989).

As an example of the amount of shift as related to the applied strain, for a beat frequency of 680 HMz, a change is strain of 1 millistrain causes a change in $v_b$ of about 4 MHz. Also, the amount of shift of the beat frequency that occurs due to applied strain or temperature depends on the type of fiber.

Figure 10:
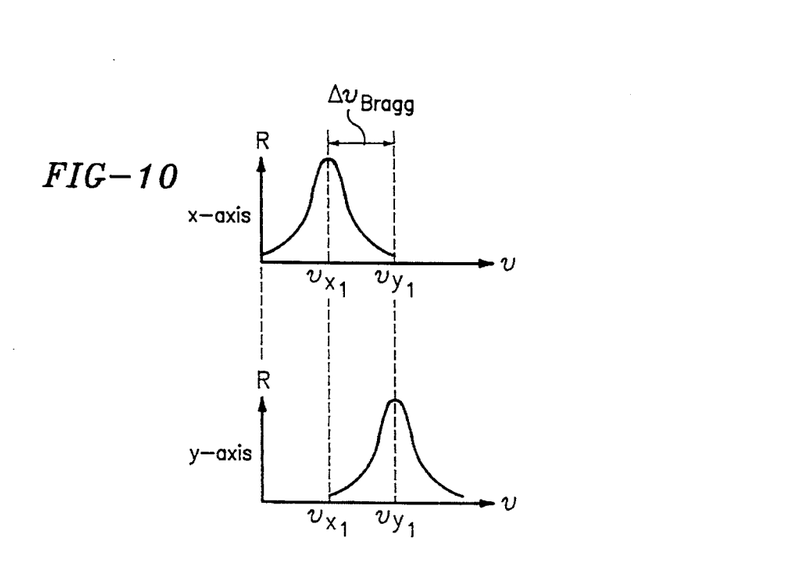
FIG. 10 is a graph showing the reflectivity of Bragg gratings seen by the X-axis and Y-axis of a fiber laser cavity, in accordance with the present invention.

Referring to FIGS. 7 and 10, the Bragg gratings 18,20 for each of the lasers 12,14,16 (FIG. 1) may be made in non-birefringent fiber which may be spliced into the fiber at the desired locations in a known way. In that case, the grating reflectivity peak seen by the X-axis polarization is at a slightly different frequency from the grating reflectivity peak seen by the Y-axis polarization. As a result, the two lasing polarization axes in the fiber cavities of each of the lasers 12,14,16 see a small frequency difference $\Delta v_{bragg}$ between the grating reflectivity peaks (which determines the lasing. frequency) as shown in the graph of FIG. 10. This difference is due to the way in which the Bragg gratings are manufactured, i.e., the way the electric field is applied to the fiber to create the grating, as is discussed in U.S. Pat. Nos. 4,807,950 and 4,725,110, to Glenn et al., entitled "Method for Impressing Gratings Within Fiber Optics". Also, it should be understood that if the gratings are spliced into the fiber, no signal degradation occurs due to the splice.

When a strain is applied to a given fiber laser (including the gratings) the reflectivity peaks of the gratings shift which is substantially due to a change in periodicity of the gratings, as discussed hereinbefore with the non-birefringent fiber laser (the shift is also due in smaller part to change in refractive index in the grating). However, because both polarization axes of the laser cavity see the same shift in reflectivity, the lasing wavelength shifts by the same amount for both lasing polarizations. Thus, the frequency difference $\Delta v_{bragg}$ between the grating reflectivity peaks remains substantially constant over the range of strains applied to the fiber. Consequently, a strain applied to the gratings does not affect the output beat frequency $v_b$. Therefore, because the $\Delta v_{bragg}$ between reflectivity peaks remains substantially constant over the operating profile, the difference between lasing frequencies of the two lasing polarization axes (and thus the beat frequency $v_b$) will be determined primarily by the birefringence of the fiber cavity.

Figure 11:
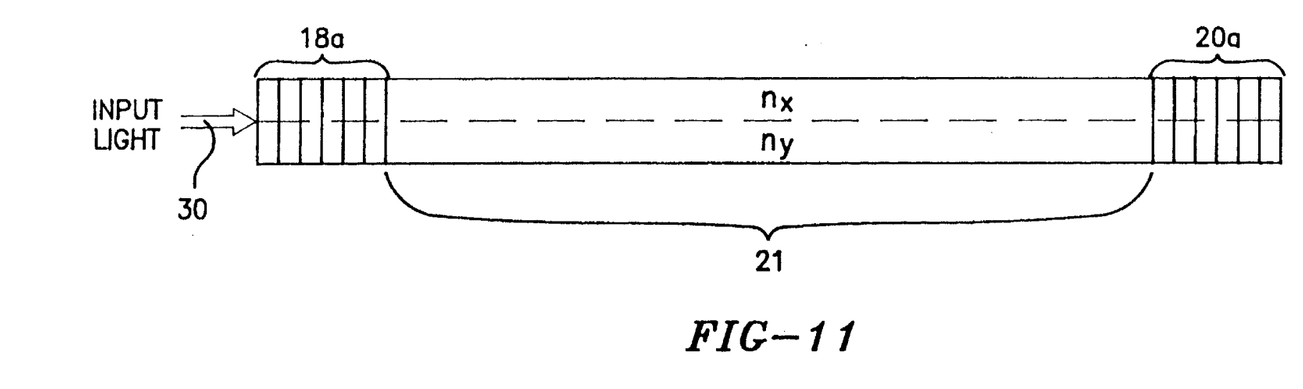
FIG. 11 is an expanded view of a single fiber laser having birefringent gratings within the fiber laser sensor, in accordance with the present invention.

Referring now to FIGS. 10 and 11, if gratings 18a,20a are impressed in a birefringent fiber (e.g., the same fiber used in the cavity), the frequency difference $\Delta v_{bragg}$ between grating reflectivity peaks seen by the polarization axes is larger than that discussed in the non-birefringent case. Consequently, the difference between the lasing frequencies of the two modes will be separated by a larger (or smaller) amount, thereby causing the beat frequency $v_b$ to be a higher frequency.

Because the birefringence of the gratings changes with applied stress, the frequency separation between the two peaks also changes. Thus, the two lasing polarization axes do not both see exactly the same frequency shift in reflectivity. Consequently, the difference between the lasing frequencies for the two polarization axes (i.e., the output difference frequency) changes due to this effect. However, it should be understood that this effect is minor compared to the initial (non-strain) difference $\Delta v_{bragg}$ between grating reflectivity peaks.

Furthermore, the invention can be made temperature insensitive by selecting an appropriate lasing wavelength where the sensitivity of the birefringence due to temperature is small, e.g., on a flat spot in the sensitivity curve.

Also, the sensor may be designed to make simultaneous temperature and strain measurements. One way to achieve this to place two lasers in the same fiber region (overlapping or in series) such that they lase at different wavelengths and there is a difference in sensitivity of the birefringence between temperature and strain at different wavelengths. For example, a first laser lasing at $\lambda 1$ has a known predetermined sensitivity of birefringence to strain of S1 and to temperature of T1, and a second laser has a known predetermined sensitivity of birefringence to strain of S2 and to temperature of T2. Thus, for a given input perturbation, a change in the beat frequency in both lasers occurs which can be used to calculate the associated a strain or temperature, based on two equations and two unknowns. Also, the separation between lasing wavelengths is not limited by the bandwidth of the gain medium because the fiber may be codoped with two different dopants that lase at different frequencies, e.g., Erbium ($Er^{3+}$) and Neodymium ($Nd^{3+}$).

Further, instead of pumping and detecting at the same end of the fiber 10, the output light may be detected at an opposite end from where the pump light is injected.

Thus, in this alternative embodiment, instead of using the optical spectrum analyzer 50 (FIG. 1) to detect the high frequency optical wavelength shift that is indicative of the implied stress, simple photodetectors 138,140,142 together with electronic discriminators or electronic spectrum analyzers may be employed to detect a much lower "beat" frequency.

Instead of the coupler 29, the lenses 102,114, the diffraction grating 106, and the fiber 42, any device which provides wavelength demultiplexing and also preserves the polarization of the light may be used if desired. Also, instead of the discriminators, an A/D converter and a microprocessor may be used to sample and. detect the frequencies of the output signals on the lines 144–148.

Even though the perturbations discussed have been with respect to temperature and strain, it should be understood by those skilled in the art that any perturbation sufficient to cause such a change in birefringence may be detected. For example, the fiber may be coated with a material that is sensitive to electro-magnetic fields and induces a strain on the fiber.

Referring now to FIG. 12, the invention may be configured as a chemical sensor by employing a fiber 200 having an elliptical or rectangular core 202 and a cladding 204 having a flat side 206 and a material 208 disposed thereon, such that the material is closer to the core along the vertical polarization axis 210 than the horizontal polarization axis 212. The material 208, e.g., Palladium (Pd), may be one that swells with absorption of a predetermined chemical, e.g., Hydrogen (H), which causes the thickness of the material to change, thereby causing a polarization dependent change in the effective refractive index of the optical waveguide. Alternatively, the refractive index of the material 208 may change with exposure to a predetermined chemical. In either case, the requirement is to cause change in the effective refractive index of the optical waveguide along one polarization and not to another.

Due to the shape of the optical core 202, the field of the vertical polarization 210 (called the TM polarization, polarized along the minor axis of the ellipse) extends vertically into the material 208 more than the horizontal polarization 212 (called the TE polarization, polarized along the major axis of the ellipse). Therefore, as the index of refraction or thickness of the material 208 changes, the vertical polarization mode 210 sees the change in refractive index more than the other. Consequently, the effective index of refraction for one mode changes while the orthogonal mode remains same, thereby causing a change in the birefringence. For temperature insensitive chemical sensing, two lasers may be located in the same general area and exposed to the same temperature variations, one having the chemical sensitive material 208 and one not. Instead of elliptical core, a circular core fiber or other core shapes may be used provided the fiber is birefringent and the evanescent decay length (beyond the core) is different for one polarization mode than for the other.

It should be understood that instead of using Bragg Gratings any reflective elements may be used if desired. However, without the narrow reflectivity band of the Bragg Gratings (and without other mode discriminating optics within the cavity), the resolution of the sensor would likely be degraded because many lasing lines would exist. Also, instead of a standing wave (linear) resonator, a travelling wave resonator, e.g., a ring laser, may be used if desired.

Also, it should be understood that for the chemical sensor, any optical waveguide having non-degenerate polarization modes (i.e., different propogation constants for each polarization mode and thereby causing the fields to extend differently into the cladding). Also, the cladding itself may alter its characteristics so as to cause a change in birefringence due to exposure to a predetermined chemical.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. An active laser perturbation sensor, comprising:

an optical waveguide for receiving and propagating a pump light of a predetermined wavelength launched into said optical waveguide;

a laser, disposed along said waveguide, being pumped by said pump light, at least a portion of said laser being exposed to a perturbation;

said laser having a laser cavity with a predetermined birefringence, having lasing light at a first lasing frequency along a first polarization axis and a second lasing frequency along a second polarization axis, said laser emitting an output light having frequencies and polarizations at said first and said second lasing frequencies and polarizations;

a difference frequency between said first and second lasing frequencies being related to the magnitude of said birefringence and said birefringence varying in response to said perturbation;

combining means for combining said first and said second polarizations of said output light onto a common polarization as a commonly polarized output light;

detector means for providing an electrical signal, indicative of said commonly polarized output light, having a frequency component related to said difference frequency between said first and said second lasing frequencies; and said laser having a pair of reflective elements on opposite ends of said laser cavity and having a gain medium therebetween.

2. The laser sensor of claim 1, wherein said reflective elements comprise reflective gratings, at least one of said gratings being reflective over a narrow frequency band which includes said lasing frequencies.

3. The laser sensor of claim 2, wherein said reflective elements comprises one narrow band and one broadband grating.

4. The laser sensor of claim 2, wherein said gratings comprise Bragg gratings.

5. The laser sensor of claim 1, further comprising a pump light source, for launching said pump light into said optical waveguide.

6. The laser sensor of claim 1, wherein said output light is detected at the same end of said waveguide as said pump light is injected.

7. The laser sensor of claim 1, further comprising an amplifying medium disposed between said pump light source and said laser.

8. The laser sensor of claim 1, wherein said waveguide is an optical fiber.

9. The laser sensor of claim 1, wherein said perturbation is a strain on said waveguide.

10. The laser sensor of claim 1, wherein said laser operates in a single longitudinal mode.

11. The laser sensor of claim 1, wherein said laser operates in a plurality of longitudinal modes.

12. The laser sensor of claim 1, wherein said laser cavity comprises:

an elongated core along which said pump and said lasing light propagates along; and a sensitive material disposed near said core, said sensitive material having an index of refraction that changes due to exposure to a predetermined chemical, thereby causing a change in said predetermined birefringence and said difference frequency.

13. The laser sensor of claim 1, wherein said laser cavity comprises:

an elongated core along which said pump and said lasing light propagates along; and a sensitive material disposed near said core, said sensitive material having a thickness that changes due to exposure to a predetermined chemical, thereby causing a change in said predetermined birefringence and said difference frequency.

14. The laser sensor of claim 1, wherein said laser cavity comprises:

a cavity optical waveguide having non-degenerate polarization modes; and a sensitive material disposed near said waveguide, said sensitive material having an index of refraction that changes due to exposure to a predetermined chemical, thereby causing a change in said predetermined birefringence and said difference frequency.

15. The laser sensor of claim 1, wherein said laser cavity comprises:

a cavity optical waveguide having non-degenerate polarization modes; and a sensitive material disposed near said waveguide, said sensitive material having a thickness that changes due to exposure to a predetermined chemical, thereby causing a change in said predetermined birefringence and said difference frequency.

16. An active laser perturbation sensor, comprising:

an optical waveguide for receiving and propagating a pump light of a predetermined wavelength launched into said optical waveguide;

a plurality of lasers, each having a laser cavity, disposed successively along said waveguide, each being pumped by said pump light, at least a portion of at least one of said lasers being exposed to a perturbation;

at least one of said lasers having a laser cavity with a predetermined birefringence, having lasing light at a first lasing frequency along a first polarization axis and a second lasing frequency along a second polarization axis, said at least one of said lasers emitting an output light having frequencies and polarizations at said first and said second lasing frequencies and polarizations;

a difference frequency between said first and second lasing frequencies being related to the magnitude of said birefringence and said birefringence varying in response to said perturbation;

combining means for combining said first and said second polarizations of said output light onto a common polarization as a commonly polarized output light;

detector means for providing an electrical signal, indicative of said commonly polarized output light, having a frequency component related to said difference frequency between said first and said second lasing frequencies;

each of said laser cavities having a pair of reflective elements on opposite ends thereof and having a gain medium therebetween, and each of said reflective elements having a reflective wavelength spectrum; and said reflective wavelength spectrums of said reflective elements of different ones of said lasers being spaced such that there is minimal overlap therebetween over the range of the magnitude of said perturbation being sensed.

17. The laser sensor of claim 16, wherein said reflective elements comprise reflective gratings, at least one of said gratings being reflective over a narrow frequency band which includes said lasing frequencies.

18. The laser sensor of claim 17, wherein said reflective elements of said at least one of said lasers comprises one narrow band and one broadband grating.

19. The laser sensor of claim 17, wherein at least one of said gratings comprise Bragg gratings.

20. The laser sensor of claim 16, further comprising a pump light source, for launching said pump light into said optical waveguide.

21. The laser sensor of claim 16, further comprising wavelength demultiplexing means, responsive to said output light from said at least one of said lasers, for providing output signals each indicative of said lasing frequencies of a corresponding one of said lasers.

22. The laser sensor of claim 16, wherein said output light is detected at the same end of said waveguide as said pump light is injected.

23. The laser sensor of claim 16, further comprising an amplifying medium disposed between said pump light source and said plurality of lasers.

24. The laser sensor of claim 16, wherein said waveguide is an optical fiber.

25. The laser sensor of claim 16, wherein said perturbation is a strain on said waveguide.

26. The laser sensor of claim 16, wherein said at least one of said lasers operates in a single longitudinal mode.

27. The laser sensor of claim 16, wherein said at least one of said lasers operates in a plurality of longitudinal modes.

28. The laser sensor of claim 16, wherein said laser cavity comprises:

an elongated core along which said pumped and said lasing light propagates along; and a sensitive material disposed near said core, said sensitive material having an index of refraction that changes due to exposure to a predetermined chemical, thereby causing a change in said predetermined birefringence and said difference frequency.

29. The laser sensor of claim 16, wherein said laser cavity comprises:

an elongated core along which said pump and said lasing light propagates along; and a sensitive material disposed near said core, said sensitive material having a thickness that changes due to exposure to a predetermined chemical, thereby causing a change in said predetermined birefringence and said difference frequency.

30. The laser sensor of claim 16, wherein said laser cavity comprises:

a cavity optical waveguide having non-degenerate polarization modes; and a sensitive material disposed near said waveguide, said sensitive material having an index of refraction that changes due to exposure to a predetermined chemical, thereby causing a change in said predetermined birefringence and said difference frequency.

31. The laser sensor of claim 16, wherein said laser cavity comprises:

a cavity optical waveguide having non-degenerate polarization modes; and a sensitive material disposed near said waveguide, said sensitive material having a thickness that changes due to exposure to a predetermined chemical, thereby causing a change in said predetermined birefringence and said difference frequency.

* * * * *